(12) United States Patent
Hakoi (10) Patent No.: US 12,399,404 B2
(45) Date of Patent: Aug. 26, 2025

(54) LIQUID CRYSTAL DISPLAY DEVICE

(71) Applicant: Sharp Display Technology Corporation, Kameyama (JP)

(72) Inventor: Hiroyuki Hakoi, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/770,713

(22) Filed: Jul. 12, 2024

(65) Prior Publication Data

US 2025/0093710 A1 Mar. 20, 2025

(30) Foreign Application Priority Data

Sep. 15, 2023 (JP) .................................. 2023-150397

(51) Int. Cl.
| | |
|---|---|
| *G02F 1/1333* | (2006.01) |
| *G02F 1/1335* | (2006.01) |
| *G02F 1/1337* | (2006.01) |
| *G02F 1/1343* | (2006.01) |
| *G02F 1/137* | (2006.01) |

(52) U.S. Cl.
CPC .... *G02F 1/13439* (2013.01); *G02F 1/133345* (2013.01); *G02F 1/133514* (2013.01); *G02F 1/133541* (2021.01); *G02F 1/133738* (2021.01); *G02F 1/133742* (2021.01); *G02F 1/13706* (2021.01); *G02F 1/13712* (2021.01); *G02F 2203/09* (2013.01)

(58) Field of Classification Search
CPC ........... G02F 1/13439; G02F 1/133345; G02F 1/133514; G02F 1/133541; G02F 1/133738; G02F 1/133742; G02F 1/13706; G02F 1/13712; G02F 2203/09
See application file for complete search history.

(56) References Cited

U.S. PATENT DOCUMENTS

| | | | |
|---|---|---|---|
| 2001/0020990 A1* | 9/2001 | Moon | G02F 1/13363 349/96 |
| 2002/0113927 A1* | 8/2002 | Ha | G02F 1/1362 349/113 |
| 2003/0133059 A1* | 7/2003 | Wei | G02F 1/133555 349/113 |

(Continued)

FOREIGN PATENT DOCUMENTS

| | | |
|---|---|---|
| JP | 2003-215639 A | 7/2003 |
| JP | 2007-025674 A | 2/2007 |

*Primary Examiner* — James A Dudek
(74) *Attorney, Agent, or Firm* — ScienBiziP, P.C.

(57) ABSTRACT

Provided is a liquid crystal display device capable of providing bright display with low voltage applied during both reflective display and transmissive display, and achieving a wide color gamut. The liquid crystal display device, includes: a liquid crystal panel including a first substrate, a second substrate, and a liquid crystal layer. The pixels each include a reflective region and a transmissive region. The first substrate includes, in order toward the liquid crystal layer, a first color filter layer, a reflective electrode, a transparent insulating layer, and pixel electrodes. The reflective electrode is disposed in the reflective region and has an aperture in the transmissive region. The pixel electrodes are in the respective pixels, each being in the reflective region and the transmissive region in the corresponding pixel. The second substrate includes a second color filter layer and a counter electrode.

12 Claims, 6 Drawing Sheets

(56) References Cited

U.S. PATENT DOCUMENTS

2006/0232529 A1* 10/2006 Midorikawa ..... G02F 1/133514
                                                    345/87
2007/0013839 A1*  1/2007 Rho ................ G02F 1/133345
                                                    349/114

* cited by examiner

LIQUID CRYSTAL DISPLAY DEVICE

CROSS-REFERENCE TO RELATED APPLICATIONS

The present application claims priority under 35 U.S.C. § 119 to Japanese Patent Application No. 2023-150397 filed on Sep. 15, 2023, the contents of which are incorporated herein by reference in their entirety.

BACKGROUND OF THE INVENTION

Field of the Invention

The present disclosure relates to liquid crystal display devices. In particular, the present disclosure relates to a transflective liquid crystal display device in which each pixel includes a reflective region and a transmissive region.

Description of Related Art

Liquid crystal display devices are generally roughly divided into transmissive liquid crystal display devices and reflective liquid crystal display devices. Transmissive liquid crystal display devices provide display in a transmissive mode using light emitted from the backlight unit. Reflective liquid crystal display devices provide display in a reflective mode using ambient light. Liquid crystal display devices have been suggested in which each pixel includes a reflective region in which display is provided in a reflective mode and a transmissive region in which display is provided in a transmissive mode. Such liquid crystal display devices are also called transflective liquid crystal display devices. Transflective liquid crystal display devices are disclosed in JP 2007-025674 A and JP 2003-215639 A, for example.

JP 2007-025674 A discloses a liquid crystal display device comprising: a first substrate, the first substrate including: a first insulating substrate, a gate line and a data line extending in substantially perpendicular directions on the first insulating substrate to define a pixel region, a thin film transistor provided at an intersection area of the gate line and the data line and having a drain electrode, an organic film formed on the thin film transistor and having a depressed portion, a reflective film formed on the organic film, a black matrix surrounding the pixel region, a color filter layer formed in the pixel region and having a different thickness in the depressed portion than in the rest of the pixel region, and a pixel electrode formed on the color filter layer; a second substrate substantially parallel to the first substrate, the second substrate including a second insulating substrate and a common electrode formed on the second insulating substrate; and a liquid crystal layer placed between the first substrate and the second substrate.

JP 2003-215639 A discloses a liquid crystal display device including: a first substrate, a second substrate, and a liquid crystal layer provided between inner surfaces of the first and the second substrates, the first substrate having a plurality of pixel regions arranged in a matrix and a plurality of switching elements; a passivation layer being provided on the first substrate and covering the switching elements, the passivation layer having a plurality of contact holes; an overcoat layer on the passivation layer, the overcoat layer having a plurality of cavities to expose the contact holes of the passivation layer; a reflection electrode in each of the pixel regions, the reflection electrode being formed on the overcoat layer and having at least one opening corresponding to the cavity of the overcoat layer; a transmission electrode formed at a location corresponding to the opening of the reflection electrode, the transmission electrode and the reflection electrode being electrically connected to each other, at least one of the transmission electrode and the reflection electrode being electrically connected to the switching element; and a color filter layer formed in the cavities of the overcoat layer and on the reflection electrode. FIG. 6 in JP 2003-215639 A discloses a configuration in which an extra color filter layer 211 is disposed as a layer under the reflective electrode 212.

BRIEF SUMMARY OF THE INVENTION

Transflective liquid crystal display devices, for example, include in each pixel a reflective region in which display is provided in a reflective mode and a transmissive region in which display is provided in a transmissive mode. The transflective liquid crystal display devices exhibit high viewability under sunlight in outdoor environments owing to the reflective display and allow viewing of information at night owing to the transmissive display using the backlight. However, the transmissive display provided by the conventional transflective liquid crystal display devices has a narrow color gamut (low NTSC ratio). Also desired is increasing the light use efficiency (reflectance) during display in the reflective mode to provide bright display in the reflective mode.

In a reflective region in JP 2007-025674 A, the reflective film 171 is electrically connected with the drain electrode 143, receives an electrical signal from the drain electrode 143, and then applies the signal to liquid crystal molecules placed on the reflective film 171 (see FIG. 2, paragraph 0042, for example). In a reflective region in JP 2003-215639 A, each reflective electrode 212 is electrically connected to the drain electrode 234b of the corresponding thin-film transistor, and applies voltage to the liquid crystal display layer 230 for color display (see FIG. 6, paragraph 0023, for example). In the reflective region in JP 2007-025674 A, since the color filter layer 185 is formed on the reflective film 171 for liquid crystal driving, the applied voltage is divided between the liquid crystal layer 300 and the color filter layer 185, leading to insufficient voltage application to the liquid crystal layer 300. Thus, in order to align liquid crystal molecules at the desired azimuth in the reflective region, the application voltage needs to be increased. Also, since the reflective film 171 is used to drive the sub-pixels in JP 2007-025674 A and the reflective electrodes 212 are used to drive the pixels in JP 2003-215639 A, the reflective film needs to be patterned for each sub-pixel or each pixel. Thus, the area of the reflective film is narrow both in JP 2007-025674 A and in JP 2003-215639 A, with which increasing the reflectance is difficult.

In response to the above issues, an object of the present invention is to provide a liquid crystal display device capable of providing bright display with low voltage applied during both reflective display and transmissive display, and achieving a wide color gamut.

(1) One embodiment of the present invention is directed to a liquid crystal display device including multiple pixels arranged in a matrix pattern, the liquid crystal display device including: a liquid crystal panel including a first substrate, a second substrate opposite to the first substrate, and a liquid crystal layer disposed between the first substrate and the second substrate, the pixels each including a reflective region in which display is provided in a reflective mode and a transmissive region in which display is provided in a transmissive mode, the first substrate including, in order toward the liquid crystal layer, a first color filter layer, a reflective electrode, a transparent insulating layer disposed in the reflective region and the transmissive region, and pixel electrodes, the reflective electrode being disposed in the reflective region and provided with an aperture in the transmissive region, the pixel electrodes being disposed in the respective pixels, each of the pixel electrodes being disposed in the reflective region and the transmissive region in the corresponding pixel, the second substrate including a second color filter layer and a counter electrode.

(2) In an embodiment of the present invention, the liquid crystal display device includes the structure (1), and the reflective electrode is disposed over the multiple pixels.

(3) In an embodiment of the present invention, the liquid crystal display device includes the structure (1), and liquid crystal molecules in the liquid crystal layer are twist-aligned.

(4) In an embodiment of the present invention, the liquid crystal display device includes the structure (1), the transparent insulating layer is provided in the transmissive region with a dent that is dented in a direction from the liquid crystal layer toward the first color filter layer, and a corresponding pixel electrode covers a surface of the dent, and a liquid crystal layer side surface of the pixel electrode disposed in the transmissive region is located closer to the first color filter layer than a liquid crystal layer side surface of the pixel electrode in the reflective region is.

(5) In an embodiment of the present invention, the liquid crystal display device includes the structure (4), and an alignment azimuth of liquid crystal molecules located near the first substrate is parallel to an alignment azimuth of liquid crystal molecules located near the second substrate.

(6) In an embodiment of the present invention, the liquid crystal display device includes any one of the structures (1) to (5), the liquid crystal layer contains liquid crystal molecules having a negative anisotropy of dielectric constant, and one vertical alignment film is disposed between the counter electrode and the liquid crystal layer and another vertical alignment film is disposed between the pixel electrode and the liquid crystal layer.

(7) In an embodiment of the present invention, the liquid crystal display device includes any one of the structures (1) to (5), the liquid crystal layer contains liquid crystal molecules having a positive anisotropy of dielectric constant, and one horizontal alignment film is disposed between the counter electrode and the liquid crystal layer and another horizontal alignment film is disposed between the pixel electrode and the liquid crystal layer.

(8) In an embodiment of the present invention, the liquid crystal display device includes any one of the structures (1) to (7), and the reflective electrode has an irregular structure in a liquid crystal layer side surface.

(9) In an embodiment of the present invention, the liquid crystal display device includes any one of the structures (1) to (8), and the liquid crystal display device includes a first polarizing plate on or near a first substrate side surface of the liquid crystal panel, and a second polarizing plate on or near a second substrate side surface of the liquid crystal panel.

(10) In an embodiment of the present invention, the liquid crystal display device includes the structure (9), and at least one of the first polarizing plate or the second polarizing plate is a circularly polarizing plate.

The present invention can provide a liquid crystal display device capable of providing bright display with low voltage applied during both reflective display and transmissive display, and achieving a wide color gamut.

DETAILED DESCRIPTION OF THE INVENTION

Hereinafter, embodiments of the present invention are described. The present invention is not limited to the contents of the following embodiments. The design may be modified as appropriate within the range satisfying the configuration of the present invention. In the following description, components having the same or similar functions in different drawings are commonly provided with the same reference sign so as to appropriately avoid repetition of description. The structures in the present invention may be combined as appropriate without departing from the gist of the present invention.

The expression herein that two directions are orthogonal to each other means that the angle formed between the directions falls preferably within the range of 90°±3°, more preferably within the range of 90°±1°, still more preferably within the range of 90°±0.5°. The expression herein that two directions are parallel to each other means that the angle formed between the directions falls preferably within the range of 0°±3°, more preferably within the range of 0°±1°, still more preferably within the range of 0°±0.5°.

Herein, the "observer side" means the side closer to the observer when the observer observes the display device, and is also referred to as a "front surface side". The "back surface side" means the side opposite to the observer side.

Embodiment 1

A liquid crystal display device of Embodiment 1, including multiple pixels arranged in a matrix pattern, includes: a liquid crystal panel including a first substrate, a second substrate opposite to the first substrate, and a liquid crystal layer disposed between the first substrate and the second substrate, the pixels each including a reflective region in which display is provided in a reflective mode and a transmissive region in which display is provided in a transmissive mode, the first substrate including, in order toward the liquid crystal layer, a first color filter layer, a reflective electrode, a transparent insulating layer, and pixel electrodes, the reflective electrode being disposed in the reflective region and provided with an aperture in the transmissive region, the pixel electrodes being disposed in the respective pixels, each of the pixel electrodes being disposed in the reflective region and the transmissive region in the corresponding pixel, the second substrate including a second color filter layer and a counter electrode.

Figure 1:
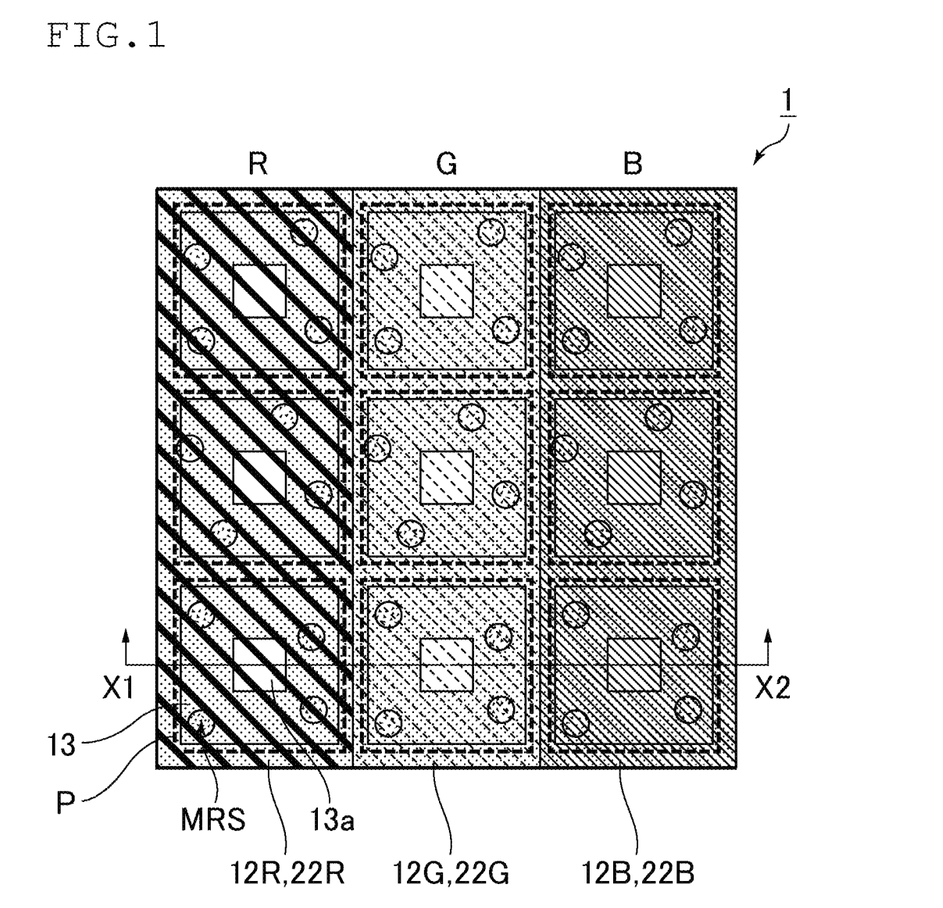
FIG. 1 is a schematic plan view of a liquid crystal display device of Embodiment 1.
Figure 2:
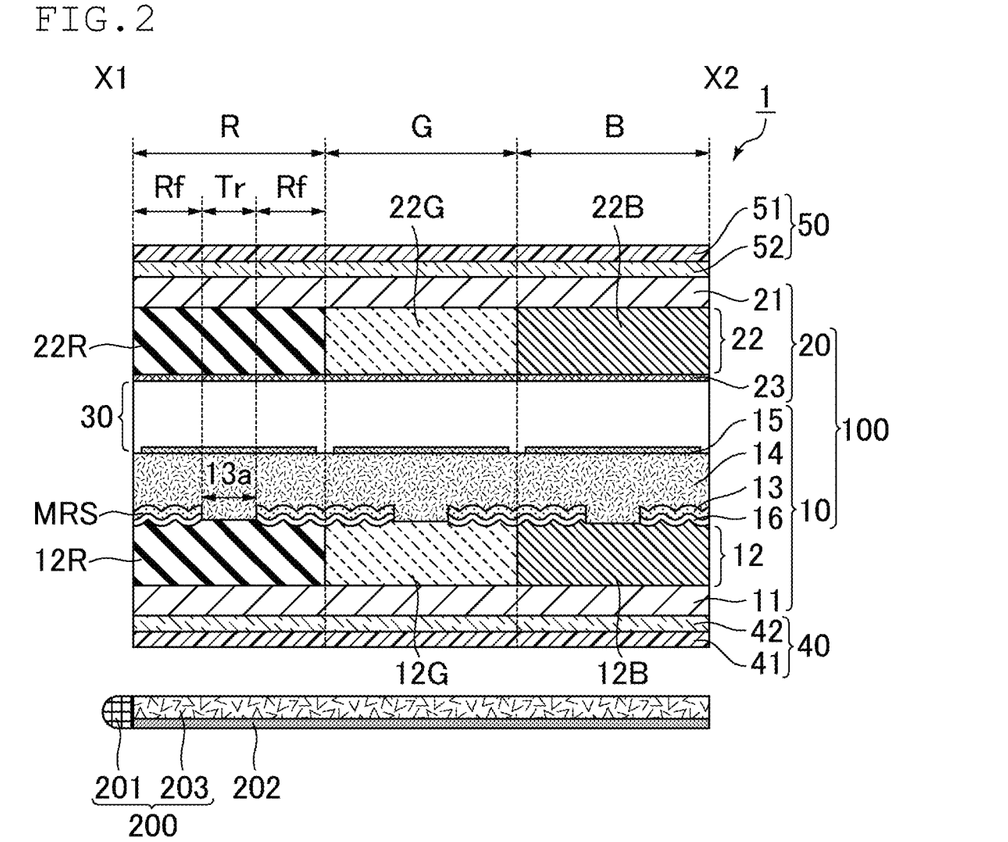
FIG. 2 is a schematic cross-sectional view taken along line X1-X2 in FIG. 1.

FIG. 1 is a schematic plan view of a liquid crystal display device of Embodiment 1. FIG. 2 is a schematic cross-sectional view taken along line X1-X2 in FIG. 1. As shown in FIG. 1, the liquid crystal display device 1 includes pixels P arranged in a matrix pattern with rows and columns. As shown in FIG. 2, the pixels P each include a reflective region Rf in which display is provided in a reflective mode and a transmissive region Tr in which display is provided in a transmissive mode. Hereinbelow, display provided in the reflective mode is also referred to as reflective display, and display provided in the transmissive mode is also referred to as transmissive display.

(Liquid Crystal Panel)

As shown in FIG. 2, a liquid crystal panel 100 includes a first substrate 10, a second substrate 20 opposite to the first substrate 10, and a liquid crystal layer 30 disposed between the first substrate 10 and the second substrate 20.

The first substrate 10 includes, in order toward the liquid crystal layer 30, a first supporting substrate 11, a first color filter layer 12, a reflective electrode 13, a transparent insulating layer 14, and pixel electrodes 15. A pixel electrode 15 for liquid crystal driving is disposed separately from the reflective electrode 13 in the reflective region, so that the reflective electrode 13 needs not to be divided for each pixel and can be disposed between pixels. This can increase the area of the reflective electrode to increase the reflectance. When the pixel electrodes 15 are disposed on the front surface side (liquid crystal layer 30 side) of the reflective electrode 13 with the transparent insulating layer 14 interposed in between, the surface of the reflective electrode 13, even in the case of having an irregular structure, on which the pixel electrodes 15 are to be formed can be a planarized surface owing to the transparent insulating layer 14. Thus, the irregular structure does not cause misalignment of liquid crystal molecules, so that alignment with high in-plane uniformity can be achieved.

When the color filter layer is disposed only in the second substrate (counter substrate), in the reflective region, ambient light incident from the observer side passes through the color filter layer, reflected by the reflective electrode, and passes through the color filter layer again, meaning that the light passes through the color filter layer twice. Meanwhile, in the transmissive region, light emitted from the backlight (backlight illumination) passes through the color filter layer only once. This results in a narrow color gamut (low NTSC ratio) during transmissive display in some cases. In contrast, the liquid crystal display device of Embodiment 1 includes color filter layers, one in the first substrate 10 and the other in the second substrate 20 and, in the first substrate 10, the first color filter layer 12 is not disposed in front of the observer side of the reflective electrode 13. Thus, the thickness of the color filter layers contributing to transmissive display (the sum of the thickness of the first color filter layer 12 and the thickness of the second color filter layer 22 in the transmissive regions Tr) is greater than the thickness of the color filter layer located in front of the observer side of the reflective electrode 13 and contributing to reflective display (thickness of the second color filter layer 22). The liquid crystal display device of Embodiment 1 thus can achieve a wider color gamut (higher NTSC ratio) during transmissive display than conventional liquid crystal display devices.

The first supporting substrate 11 is a substrate that supports the constituent components of the first substrate 10, such as the first color filter layer 12, the reflective electrode 13, the transparent insulating layer 14, and the pixel electrodes 15. The material of the transparent substrate can be, for example, alkali-free glass or plastic. The term "transparent" herein means being transparent to light. Specifically, the term means that the light (e.g., visible light) transmittance (e.g., parallel ray transmittance) is 80% or higher and 100% or lower.

Although not shown, circuits (backplane circuits) for driving the pixels P may be formed in the first substrate 10. The backplane circuits are formed, for example, between the first supporting substrate 11 and the first color filter layer 12. The first color filter layer 12 may cover the backplane circuits. For example, the backplane circuits may include memory circuits (e.g., SRAMs) connected to the respective pixels P. A liquid crystal display device including memory circuits for the respective pixels P is sometimes called a "memory liquid crystal". Also, the backplane circuits may include thin film transistors (TFTs) connected to the respective pixel electrodes 15, gate bus lines, source bus lines, and the like connected to the TFTs as in a typical active matrix substrate. A specific configuration of a memory liquid crystal is disclosed, for example, in JP 5036864 B. The contents of JP 5036864 B are incorporated herein by reference in their entirety.

The TFTs are, for example, those including as an active layer an amorphous silicon layer, a polysilicon layer, or an oxide semiconductor layer containing an In—Ga—Zn—O-based semiconductor (see JP 2014-007399 A). The contents of JP 2014-007399 A are incorporated herein by reference in their entirety.

The first color filter layer 12 may include red color filters 12R, green color filters 12G, and blue color filters 12B. A pixel in which a red color filter 12R is disposed is also referred to as a red pixel R. A pixel in which a green color filter 12G is disposed is also referred to as a green pixel G. A pixel in which a blue color filter 12B is disposed is also referred to as a blue pixel B. A black matrix (light-blocking layer) may be disposed between a red color filter 12R, a green color filter 12G, and a blue color filter 12B. Yet, in order to achieve brighter display, the black matrix is preferably not disposed.

The first color filter layer 12 is located to overlap at least an aperture 13a (transmissive region Tr) in the reflective electrode 13. The first color filter layer 12 may also be disposed on the back surface side (side opposite to the liquid crystal layer 30) of the reflective electrode 13 in the reflective region Rf. When the directionality of the backlight is low, the backlight illumination spreads and includes light that obliquely passes through the first color filter layer 12. Thus, with the first color filter layer 12 disposed also under the reflective electrode 13 except for the aperture 13a, entry of achromatic color light into the aperture 13a can be prevented, and thus a decrease in chroma during transmissive display can be prevented.

The material of the first color filter layer 12 can be one commonly used in the field of liquid crystal panels. Examples include negative or positive photosensitive resins containing a pigment. Examples of the photosensitive resins include acrylic resins, polyvinyl phenolic resins, and novolac resins.

As described below, when an irregular structure (MRS) is formed in the liquid crystal layer 30 side surface of the reflective electrode 13, the irregular structure may be formed in the surface of the first color filter layer 12, and a reflective electrode 13 may be formed on the irregular structure. In consideration of the thickness suitable for formation of the irregular structure, the thickness of the first color filter layer 12 is preferably 1.0 μm or greater and 2.5 μm or smaller, more preferably 1.3 μm or greater and 2.0 μm or smaller.

Preferably, the thickness of the first color filter layer 12 is equal to or greater than the thickness of the second color filter layer 22. While reflective display light passes through the second color filter layer 22 in the second substrate 20 twice, transmissive display light passes through the second color filter layer 22 only once. Thus, when the first color filter layer 12 and the second color filter layer 22 are formed using color resists having the same pigment concentration, in order to make the color gamut during transmissive display equivalent to or wider than that during reflective display, the thickness of the first color filter layer 12 in the first substrate 10 is preferably greater than the thickness of the second color filter layer 22.

The reflective electrode 13 is a reflective component formed on the first color filter layer 12 and reflects ambient light, having been incident from the observer side and passed through the liquid crystal layer 30, toward the observer side again. The reflective electrode 13 is disposed in the reflective region Rf and has an aperture 13a in the transmissive region Tr. In other words, a region in a single pixel P in which the reflective electrode 13 is disposed is a reflective region Rf, and a region in a single pixel P in which the reflective electrode 13 is not disposed (region overlapping the aperture 13a) is a transmissive region Tr. The aperture 13a can also be regarded as being surrounded by the reflective electrode 13 in a plan view.

An aperture 13a is preferably formed in each pixel P, more preferably in the center of each pixel P. When an aperture 13a for transmissive display is formed in the center of the reflective electrode 13 in each pixel P, the boundaries of different colors in the first color filter layer 12 are covered with the reflective electrode 13, reducing the occurrence of color mixing. In addition, the transmissive region Tr can be formed in each pixel P even when the alignment accuracy of the first substrate 10 and the second substrate 20 is somewhat low, so that the productivity can be increased. A single aperture 13a may be formed in a single pixel P as shown in FIG. 1 and FIG. 2, or multiple apertures 13a may be formed in a single pixel P.

The reflective electrode 13 is preferably disposed over multiple pixels. In other words, the reflective electrode 13 is preferably disposed in the reflective region Rf in each pixel P and between two pixels P adjacent to each other at least in a row direction or a column direction (in a region overlapping the region between adjacent pixel electrodes 15 in a plan view). In other words, the reflective electrode 13 is preferably not divided (patterned) for each pixel P. This configuration can make the regions between the pixels P contribute to reflective display, further increasing the reflectance. In order to further increase the reflectance, the reflective electrode 13 is more preferably disposed between pixels adjacent to one another in a row direction and a column direction. The expression "the reflective electrode 13 is disposed over multiple pixels" means that the reflective electrode 13 is disposed over at least two pixels adjacent to each other in a row direction or a column direction; the reflective electrode 13 is not necessarily disposed over all the pixels.

The reflective electrode 13 preferably has an irregular structure in its liquid crystal layer 30 side surface. Having an irregular structure in the surface, the reflective electrode 13 can diffusively reflect ambient light to achieve bright reflective display. The irregular structure is also referred to as a micro reflective structure (MRS). The irregular structure, for example, can be defined by bumps randomly arranged with the center-to-center distance between adjacent bumps being 5 µm or more and 50 µm or less, preferably 10 µm or more and 20 µm or less. In a view from the normal to the display surface, the shape of the bumps is substantially circular or substantially polygonal. The area of the bumps occupying the corresponding pixel P is, for example, about 20% to 40%. The height of each bump is, for example, 1 µm or more and 5 µm or less.

The irregular structure can be formed by, for example, forming the first color filter layer 12 on the first supporting substrate 11, forming the irregular structure in the surface of the first color filter layer opposite to the first supporting substrate 11 by a method such as photolithography, and sputtering a reflective electrode material on the irregular structure. In this case, the first color filter layer 12 has an irregular structure in its liquid crystal layer 30 side surface and the reflective electrode 13 has in its surface an irregular structure reflecting the irregular structure of the first color filter layer 12. The method of forming the irregular structure can be, for example, a method disclosed in JP 3394926 B.

Another method of achieving bright reflective display can be a method including making the reflective electrode 13 have a flat specular surface and, for example, disposing a light scattering film between a first polarizing plate 40 and the liquid crystal panel 100.

The reflective electrode 13 is formed from a metal material with a high reflectance. The metal material for forming the reflective electrode 13 can be, for example, aluminum, silver, and an alloy of these metals.

The reflective electrode 13 may be electrically connected to the backplane circuits. The same electrical potential as the electrical potential (common electrical potential) applied to the counter electrode 23 may be applied to the reflective electrode 13. In this case, the pixel electrodes 15, the reflective electrode 13, and the transparent insulating layer 14 between these electrodes form auxiliary capacitance.

A transparent electrode 16 may be stacked on the back surface side of the reflective electrode 13. The transparent electrode 16 may be in contact with the reflective electrode 13. The transparent electrode 16 can be formed from a transparent conductive material similar to that used to form the pixel electrodes 15 as described below.

The transparent insulating layer 14 is disposed in the reflective region Rf and the transmissive region Tr of each pixel P. The transparent insulating layer 14 is an insulating layer disposed between the reflective electrode 13 and the pixel electrodes 15, and is preferably disposed to cover at least the reflective electrode 13, more preferably disposed to cover the reflective electrode 13 and the apertures 13a.

The material of the transparent insulating layer 14 can be one commonly used in the field of liquid crystal panels. Examples include negative or positive photosensitive resins containing no pigment.

In order to prevent a decrease in reflectance and transmittance due to the presence of the transparent insulating layer 14, the thickness of the transparent insulating layer 14 is preferably 1.0 µm or greater and 2.5 µm or smaller, more preferably 1.4 µm or greater and 2.0 µm or smaller.

The pixel electrodes 15 are disposed in the respective pixels P, each of the pixel electrodes 15 being disposed in the reflective region Rf and the transmissive region Tr in the corresponding pixel P. This configuration enables each pixel electrode to drive the liquid crystal molecules in the reflective region Rf and the transmissive region Tr in the corresponding single pixel. In addition, the pixel electrodes 15 are disposed on the reflective electrode 13 through the transparent insulating layer 14, and the first color filter layer 12 is disposed on or behind the back surface side of the reflective electrode 13. In other words, a configuration is employed in which no insulating component such as a color filter layer is disposed between the pixel electrodes 15 and the liquid crystal layer 30 and a single pixel electrode is used to drive the liquid crystal molecules in the reflective region Rf and the transmissive region Tr in the corresponding single pixel. This configuration causes no division of the applied voltage between the color filter layer and the liquid crystal layer, thus enabling sufficient voltage application to the liquid crystal layer to achieve bright display even with low voltage applied, as compared to the configuration disclosed in JP 2007-025674 A which includes color filters on the liquid crystal layer side of the electrode for liquid crystal driving (reflective electrode in JP 2007-025674 A).

The pixel electrodes 15 are preferably formed from a transparent conductive material. The transparent conductive material can be indium tin oxide (ITO), indium zinc oxide (IZO®), or a mixture thereof. When the reflective film functions also as an electrode for liquid crystal driving as in JP 2007-025674 A, flicker sometimes occurs due to a difference in work function between the metal material of the reflective film and the transparent conductive material of the counter electrode. In the present embodiment, the pixel electrodes 15 for liquid crystal driving are disposed separately from the reflective electrode 13 in the reflective regions and thus can be formed from the same transparent conductive material as the counter electrode described below, so that occurrence of flicker can be reduced or prevented.

Figure 3:
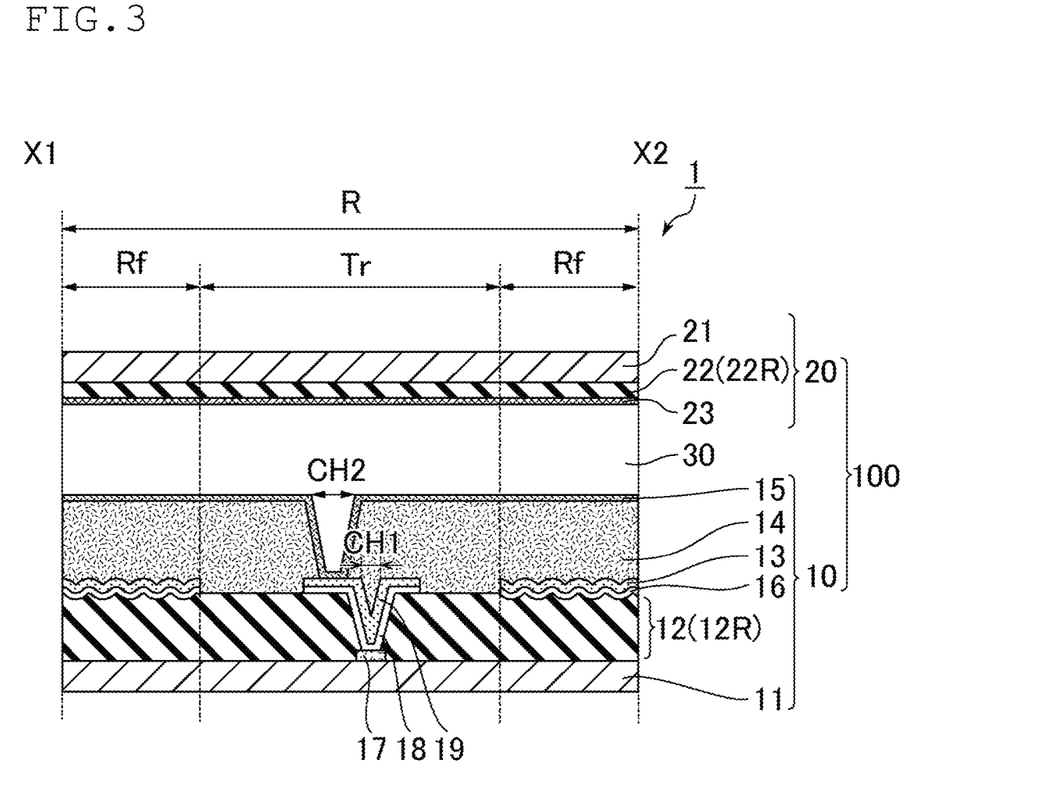
FIG. 3 is a schematic cross-sectional view of a single pixel in the case where a contact hole is formed in each transmissive region in Embodiment 1.

The pixel electrodes 15 are electrically connected to the backplane circuits. Each pixel electrode 15 may be electrically connected to the backplane circuits through a contact hole formed in the transmissive region Tr. FIG. 3 is a schematic cross-sectional view of a single pixel in the case where a contact hole is formed in each transmissive region in Embodiment 1. As shown in FIG. 3, for example, a first contact electrode 17 electrically connected to the backplane circuits may be disposed on the supporting substrate 11, and a second contact electrode 18 and a third contact electrode 19 may be formed in the first color filter layer 12 (12R). The first contact electrode 17 may be electrically connected to the second and third contact electrodes 18 and 19 through a first contact hole CH1 penetrating the first color filter layer 12 (12R). The second and third contact electrodes 18 and 19 may be electrically connected to the corresponding pixel electrode 15 through a second contact hole CH2 penetrating the transparent insulating layer 14.

The material of the second contact electrode 18 may be a transparent conductive material similar to that of the transparent electrode 16. The material of the third contact electrode 19 may be a metal material similar to that of the reflective electrode 13. When the third contact electrode 19 is formed from a metal material similar to that of the reflective electrode 13, a region with the third contact electrode 19 disposed functions as a reflective region Rf. FIG. 3 shows an example in which the second contact electrode 18 and the third contact electrode 19 are stacked. Yet, either the second contact electrode 18 or the third contact electrode 19 alone may be disposed.

The second substrate 20 includes the second supporting substrate 21, the second color filter layer 22, and the counter electrode 23 in order toward the liquid crystal layer 30.

The second supporting substrate 21 is a substrate that supports the constituent components of the second substrate 20, such as the second color filter layer 22 and the counter electrode 23. The second supporting substrate 21 is preferably a transparent substrate, and can be a substrate formed from a material similar to that of the first supporting substrate 11.

The second color filter layer 22 may include red color filters 22R, green color filters 22G, and blue color filters 22B. The material of the second color filter layer 22 can be one similar to that of the first color filter layer 12. A black matrix (light-blocking layer) may be disposed between a red color filter 22R, a green color filter 22G, and a blue color filter 22B. Yet, in order to achieve brighter display, the black matrix is preferably not disposed.

The red color filters 22R, the green color filters 22G, and the blue color filters 22B in the second color filter layer 22 are each disposed to face a color filter of the same color in the first color filter layer 12. In other words, in a plan view, color filters are preferably disposed such that a color filter of a certain color in the first color filter layer 12 overlaps a color filter of the same color in the second color filter layer 22; preferably, red color filters 12R and 22R are disposed in a red pixel R, green color filters 12G and 22G are disposed in a green pixel G, and blue color filters 12B and 22B are disposed in a blue pixel B.

The counter electrode 23 is opposite to the pixel electrodes 15. The counter electrode 23 can be formed from a transparent conductive material similar to that of the pixel electrodes 15. One counter electrode 23 may be disposed in one pixel or the counter electrode 23 may be disposed over multiple pixels, as long as the same common electrical potential is applied to the entire counter electrode 23.

The liquid crystal layer 30 includes liquid crystal molecules. The liquid crystal molecules may be liquid crystal molecules having a negative anisotropy of dielectric constant ($\Delta\varepsilon$) according to the following formula (L) or positive liquid crystal molecules having a positive anisotropy of dielectric constant ($\Delta\varepsilon$) according to the following formula (L).

$$\Delta\varepsilon = \text{(dielectric constant in long axis direction)} - \text{(dielectric constant in short axis direction)} \quad \text{(L)}$$

In Embodiment 1, the liquid crystal molecules in the liquid crystal layer 30 are preferably twist-aligned. Being "twist-aligned" means alignment in which the liquid crystal molecules near the first substrate 10 in the liquid crystal layer 30 and the liquid crystal molecules near the second substrate 20 in the liquid crystal layer 30 are different in alignment azimuth. Hereinafter, an angle formed between the alignment azimuth of liquid crystal molecules near the first substrate 10 and the alignment azimuth of liquid crystal molecules near the second substrate 20 in a plan view is also referred to as a "twist angle".

The liquid crystal layer 30 may contain the liquid crystal molecules and a chiral agent. Examples of the chiral agent include those known in the field of liquid crystal panels.

The liquid crystal panel 100, although not shown, may include alignment films, one between the counter electrode 23 and the liquid crystal layer 30 and one between the pixel electrodes 15 and the liquid crystal layer 30. An alignment film is a film that controls the alignment azimuth of liquid crystal molecules with no voltage applied and is disposed in contact with the liquid crystal layer 30. The alignment films can be formed from, for example, a polymer with a structure such as a polyimide, polyamic acid, or polysiloxane structure in its main chain. At least one of the alignment films has been subjected to alignment treatment such as rubbing or photoalignment treatment. The state "with no voltage applied" means a state where voltage is not applied between the pixel electrodes and the counter electrode, and includes cases where voltage lower than the threshold for liquid crystal molecules is applied to the liquid crystal layer.

The alignment films may each be a vertical alignment film which aligns the liquid crystal molecules substantially vertically thereto with no voltage applied to the liquid crystal layer 30. The alignment films may each be a horizontal alignment film which aligns liquid crystal molecules substantially horizontally thereto with no voltage applied to the liquid crystal layer 30.

The liquid crystal molecules being aligned "substantially vertically" means that the tilt angle is 83° or greater and 90° or smaller, preferably 85° or greater and 90° or smaller, more preferably 87.5° or greater and 88.0° or smaller. The liquid crystal molecules being aligned "substantially horizontally" means that the tilt angle is 0° or greater and 10° or smaller, preferably 0° or greater and 5° or smaller, more preferably 0° or greater and 2° or smaller.

The display mode of the liquid crystal display device of Embodiment 1 is preferably the vertical aligned twisted nematic (VA-TN) mode. In the VA-TN mode, for example, the liquid crystal layer 30 contains a negative liquid crystal and a chiral agent. When the liquid crystal layer contains liquid crystal molecules having a negative anisotropy of dielectric constant (negative liquid crystal), vertical alignment films are preferably disposed, one between the counter electrode and the liquid crystal layer and one between the pixel electrodes and the liquid crystal layer. In the VA-TN mode, the liquid crystal molecules in the liquid crystal layer 30 are vertically aligned with no voltage applied to the liquid crystal layer 30 while twist-aligned horizontally with a predetermined voltage applied to the liquid crystal layer 30.

Vertical photoalignment films used for photoalignment treatment preferably contain at least one of a cinnamate group, an azobenzene group, a chalcone group, a stilbene group, or a coumarine group as a photoreactive functional group. Containing these photoreactive functional groups, highly reliable alignment films can be obtained without photodegradation product dissolution into the liquid crystal layer 30, allowing alignment treatment with low irradiation energy.

In the VA-TN mode, a positive liquid crystal can also be used. When the liquid crystal layer contains liquid crystal molecules (positive liquid crystal) having a positive anisotropy of dielectric constant, horizontal alignment films are preferably disposed, one between the counter electrode and the liquid crystal layer and one between the pixel electrodes and the liquid crystal layer.

(Polarizing Plate)

The liquid crystal display device 1 of Embodiment 1 preferably includes the first polarizing plate 40 near the first substrate 10 of the liquid crystal panel 100 and a second polarizing plate 50 near the second substrate 20.

The first polarizing plate 40 and the second polarizing plate 50 may each be a linearly polarizing plate. A linearly polarizing plate is a polarizer that converts incident light to linearly polarized light to change the polarization state and/or direction of the incident light. Examples of the linearly polarizing plate include absorptive polarizing plates and reflective polarizing plates. An absorptive polarizing plate has an absorption axis along which the polarizing plate absorbs light having a specific polarization direction and a transmission axis orthogonal to the absorption axis. A reflective polarizing plate has a reflection axis along which the polarizing plate reflects light having a specific polarization direction, and a transmission axis orthogonal to the reflection axis.

Examples of the absorptive polarizing plate include a linearly polarizing plate including a film polarizer obtained by dying and stretching a polyvinyl alcohol (PVA) film and a triacetyl cellulose (TAC) protective layer; a dye-type polarizing plate; and a coating-type polarizing plate.

Examples of the reflective linearly polarizing plate include a multilayer reflective polarizing plate (product name: DBEF) available from Sumitomo 3M Japan Limited, and combinations of a cholesteric liquid crystal film and a λ/4 plate. When a reflective polarizing plate is used, backlight illumination, which is absorbed along the absorption axis in the case of using an absorptive polarizing plate, is reflected by the reflective polarizing plate and then further reflected by a reflector in the backlight to the observer side to be recycled, so that bright reflective display can be achieved. The reflective polarizing plate may be a constituent component of the backlight.

At least one of the first polarizing plate 40 or the second polarizing plate 50 is preferably a circularly polarizing plate. A circularly polarizing plate is a polarizer that converts incident light to circularly polarized light. The first polarizing plate 40 may be a circularly polarizing plate in which the linearly polarizing plate 41 and the phase difference layer 42 are laminated. The second polarizing plate 50 may be a circularly polarizing plate in which the linearly polarizing plate 51 and the phase difference layer 52 are laminated. Both the first polarizing plate and the second polarizing plate are more preferably circularly polarizing plates.

Examples of the phase difference layer include those having a structure with one ¼ plate and those having a structure with a combination of one ¼ plate and one to two ½ plates or one to two negative C plates.

In the liquid crystal display device 1 of Embodiment 1, the transmission axis azimuths of the first polarizing plate and the second polarizing plate, the slow axis azimuth of the phase difference layer, and the alignment azimuth of the liquid crystal molecules, for example, may be adjusted, so that the liquid crystal display device 1 may be a normally black liquid crystal display device which provides black display with no voltage applied and provides white display with voltage applied.

The transmission axis of the linearly polarizing plate 41 and the transmission axis of the linearly polarizing plate 51 are preferably orthogonal to each other. When the circularly polarizing plate is a combination of a linearly polarizing plate and a ¼ plate, the transmission axis of the linearly polarizing plate preferably forms an angle of approximately 45° with the slow axis of the ¼ plate. The "angle of approximately 45°" above means that the angle formed between two directions preferably falls within the range of 45°+3°, more preferably within the range of 45°+1°, still more preferably within the range of 45°+0.5°.

(Backlight)

The liquid crystal display device 1 may include a backlight 200 on or behind the back surface side of the liquid crystal panel 100. The backlight 200 may be disposed on the side of the first polarizing plate 40 opposite to the liquid crystal panel 100.

The backlight 200 may include light sources (e.g., LEDs) 201 which emit light, a light guide plate 202 which leads light from the light sources 201 toward the liquid crystal panel, and a reflector 203 placed on the back surface side of the light guide plate 202. Although not shown, the backlight 200 may further include a prism sheet and a diffuser sheet which are placed on the front surface side of the light guide plate 202.

Embodiment 2

Figure 4:
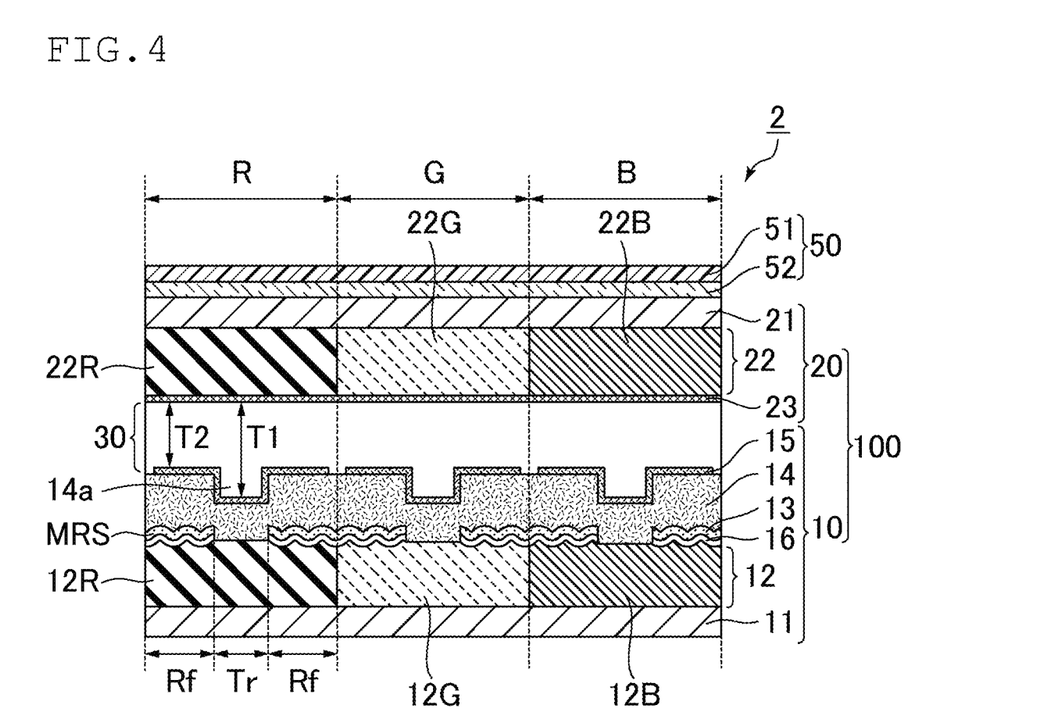
FIG. 4 is a schematic cross-sectional view of a liquid crystal display device of Embodiment 2.

FIG. 4 is a schematic cross-sectional view of a liquid crystal display device of Embodiment 2. The plan view of the liquid crystal display device of Embodiment 2 is similar to that in FIG. 1, and thus description thereof is omitted. Also, description of the structures common to those in Embodiment 1 is omitted. The liquid crystal display device of Embodiment 2 may also include a backlight on or behind the back surface side of the liquid crystal panel 100 as in Embodiment 1.

As shown in FIG. 4, in a liquid crystal display device 2 of Embodiment 2, the transparent insulating layer 14 of the liquid crystal panel 100 has, in each transmissive region Tr, a dent 14a dented in a direction from the liquid crystal layer 30 toward the first color filter layer 12. Although FIG. 4 shows an example in which a dent 14a is formed in the entire corresponding transmissive region Tr, but the dent 14a may be formed in part of the transmissive region Tr. With the dents 14a formed in the transparent insulating layer 14, the transmittance of the transmissive regions Tr can be increased. The dents 14a can be formed in the transparent insulating layer 14 by a method such as photolithography. The side surface of each dent 14a may be inclined.

For formation of the dents 14a, the thickness of the transparent insulating layer 14 is preferably 1.0 μm or greater and 2.5 μm or smaller. For prevention of a decrease in reflectance and transmittance due to the presence of the transparent insulating layer 14, the thickness of the transparent insulating layer 14 is preferably 1.0 μm or greater and 2.5 μm or smaller, more preferably 1.4 μm or greater and 2.0 μm or smaller.

The pixel electrodes 15 are formed on the transparent insulating layer 14 after formation of the dents 14a in the transparent insulating layer 14. The pixel electrodes 15 preferably cover the surfaces of the dents 14a in the transparent insulating layer 14, and may conform to the recessed parts of the dents 14a. The pixel electrodes 15 are dented in response to the dents 14a. Since the transparent insulating layer 14 has the dents 14a in the respective transmissive regions Tr and the pixel electrodes 15 are formed on the transparent insulating layer 14, the liquid crystal layer 30 side surfaces of the pixel electrodes 15 disposed in the transmissive regions Tr are located closer to the first color filter layer 12 (back surface side) than the liquid crystal layer 30 side surfaces of the pixel electrodes 15 in the reflective regions Rf are.

Figure 5:
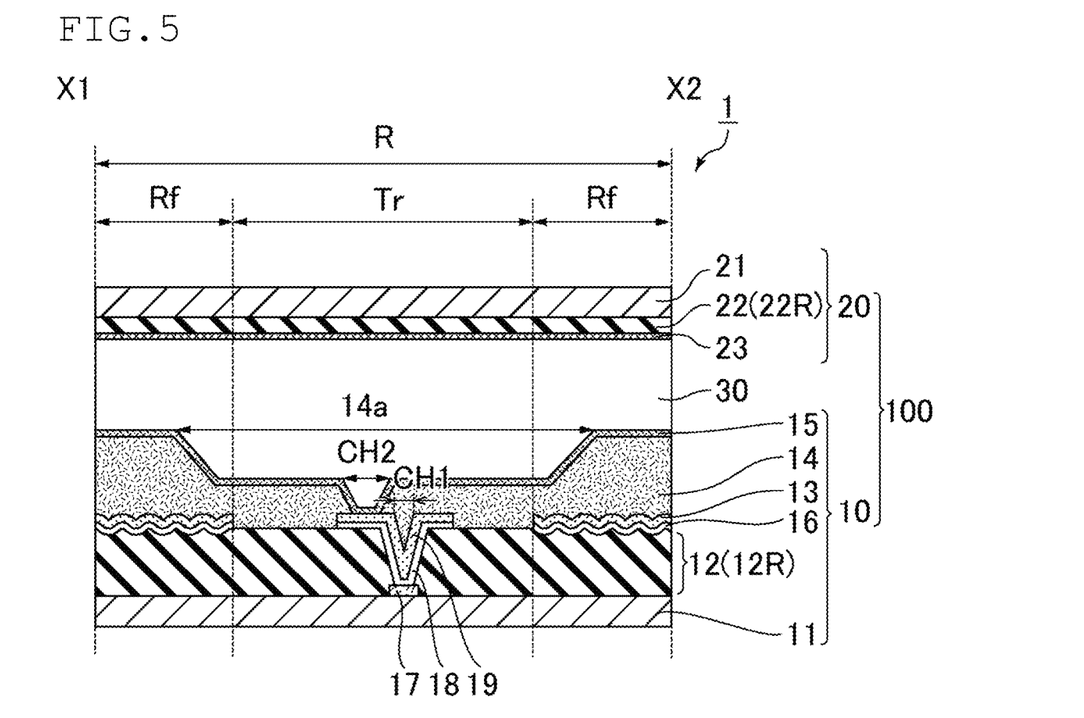
FIG. 5 is a schematic cross-sectional view of a single pixel in the case where a contact hole is formed in each transmissive region in Embodiment 2.

In Embodiment 2, as in Embodiment 1, the pixel electrodes 15 may be electrically connected to the backplane circuits through contact holes formed in the transmissive regions Tr. FIG. 5 is a schematic cross-sectional view of a single pixel in the case where a contact hole is formed in each transmissive region in Embodiment 2. As shown in FIG. 5, in Embodiment 2, a first contact hole CH1 and a second contact hole CH2 may be formed in each dent 14a.

Since the dents 14a are each recessed in the direction from the liquid crystal layer 30 toward the first color filter layer 12, the thickness T1 in each transmissive region Tr of the liquid crystal layer 30 is greater than the thickness T2 in each reflective region Rf of the liquid crystal layer 30. With the T1 being greater than the T2, a higher transmittance can be achieved.

The display mode of the liquid crystal display device of Embodiment 2 is preferably a vertical aligned electrically controlled birefringence (VA-ECB) mode. In the VA-ECB mode, the liquid crystal layer 30 preferably contains no chiral agent. When a negative liquid crystal is used, the alignment films are preferably vertical alignment films. In the VA-ECB mode, the negative liquid crystal in the liquid crystal layer 30 is vertically aligned with no voltage applied to the liquid crystal layer 30 while being horizontally aligned with a predetermined magnitude of voltage applied to the liquid crystal layer 30, and the alignment azimuth of liquid crystal molecules near the first substrate is parallel to the alignment azimuth of liquid crystal molecules near the second substrate. In other words, the twist angle of the liquid crystal molecules in the liquid crystal layer 30 is preferably substantially 0°. The expression "the twist angle is substantially 0°" encompasses cases where the twist angle is close to 0° within the range of manufacturing tolerance.

Brighter transmissive display can be achieved when the dents 14a are formed in the transmissive regions Tr in the transparent insulating layer 14, the thickness of the liquid crystal layer 30 in each transmissive region Tr is greater than the thickness of the liquid crystal layer 30 in each reflective region Rf, and the VA-ECB mode is employed.

In the VA-ECB mode, the liquid crystal molecules can also be negative liquid crystal molecules. When the liquid crystal layer 30 contains a negative liquid crystal, the alignment films are preferably horizontal alignment films.

EXAMPLE

The present invention is described below with reference to examples and comparative examples. The present invention is not limited to these examples.

Example 1

Example 1 is a specific example of Embodiment 1 and employs a structure shown in FIG. 1 to FIG. 3. The structure of Example 1 specifically included components shown below.

First supporting substrate and second supporting substrate: glass substrate (alkali-free glass substrate)

Reflective electrode: silver alloy (MRS was formed in liquid crystal layer side surface)

Pixel electrode, transparent electrode, and counter electrode: ITO

Transparent insulating layer: organic insulating layer (thickness=1.5 μm)

First color filter layer and second color filter layer: red, green, blue color filters included (thickness of each filter=2.0 μm). White transmittance of each layer was 56.8%. White transmittance is a value obtained by adding the luminance values of the red, green, and blue pixels, and dividing the resulting value by 3.

Liquid crystal layer: negative liquid crystal, with chiral agent used

Display mode: VA-TN mode (twist angle of liquid crystal molecules was) 80°

Thickness of liquid crystal layer in reflective region: 3.0 μm

Thickness of liquid crystal layer in transmissive region: 3.0 μm

First polarizing plate and second polarizing plate: circularly polarizing plate obtained by combining a linearly polarizing plate and a phase difference layer (λ/4 plate and λ/2 plate)

Backlight: edge-lit backlight including LEDs as its light sources

Example 2

Example 2 is a specific example of Embodiment 2 and employs a structure shown in FIG. 1, FIG. 4, and FIG. 5. Example 2 is similar to Example 1, except that the structures of the liquid crystal layer and the TFT substrate are different. Specific structures are described below.

Liquid crystal layer: negative liquid crystal, with no chiral agent used
Display mode: VA-ECB (twist angle of liquid crystal molecules was) 0°
Thickness of liquid crystal layer in reflective region: 2.0 μm
Thickness of liquid crystal layer in transmissive region: 2.8 μm Comparative Example 1

Figure 6:
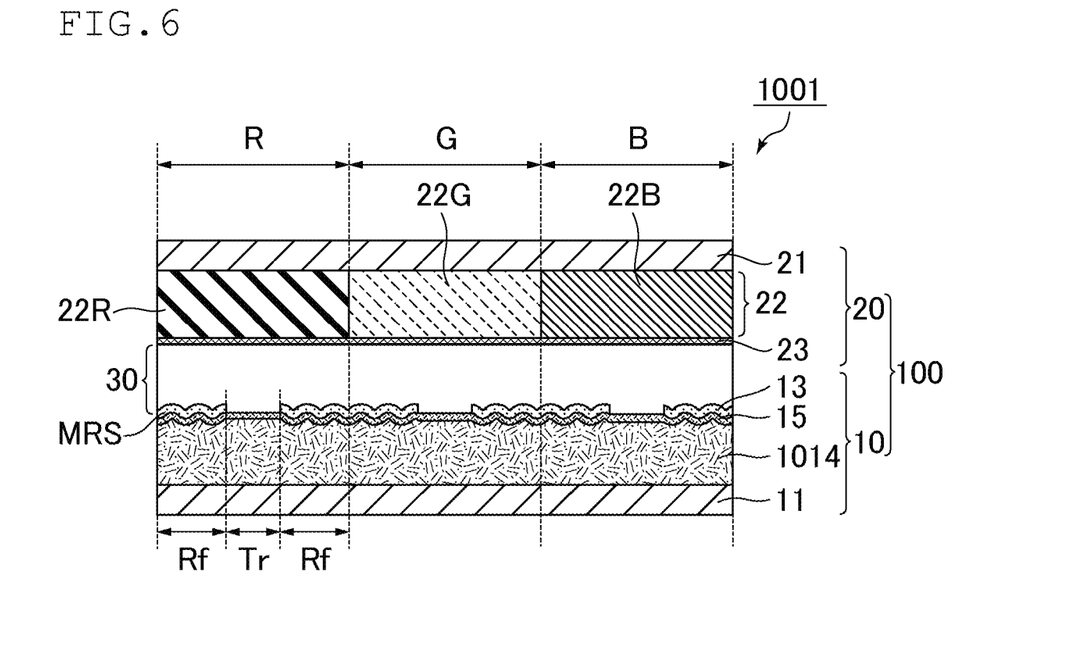
FIG. 6 is a schematic cross-sectional view of a liquid crystal display device of Comparative Example 1.

FIG. 6 is a schematic cross-sectional view of a liquid crystal display device of Comparative Example 1. As shown in FIG. 6, a liquid crystal panel 1001 of Comparative Example 1 had a structure in which the first substrate 10 included no first color filter layer and included a transparent insulating layer 1014 in place of the first color filter layer behind the back surface side of the reflective electrode 13 (the side opposite to the liquid crystal layer 30). The transparent insulating layer 1014 was one similar to the transparent insulating layer 14 in Example 1. The transparent insulating layer 14 was not disposed on the liquid crystal layer 30 side of the reflective electrode 13, and the pixel electrodes 15 were disposed on the back surface side of the reflective electrode 13. Comparative Example 1 employed a structure similar to that in Example 1, except for these components.

Comparative Example 2

Figure 7:
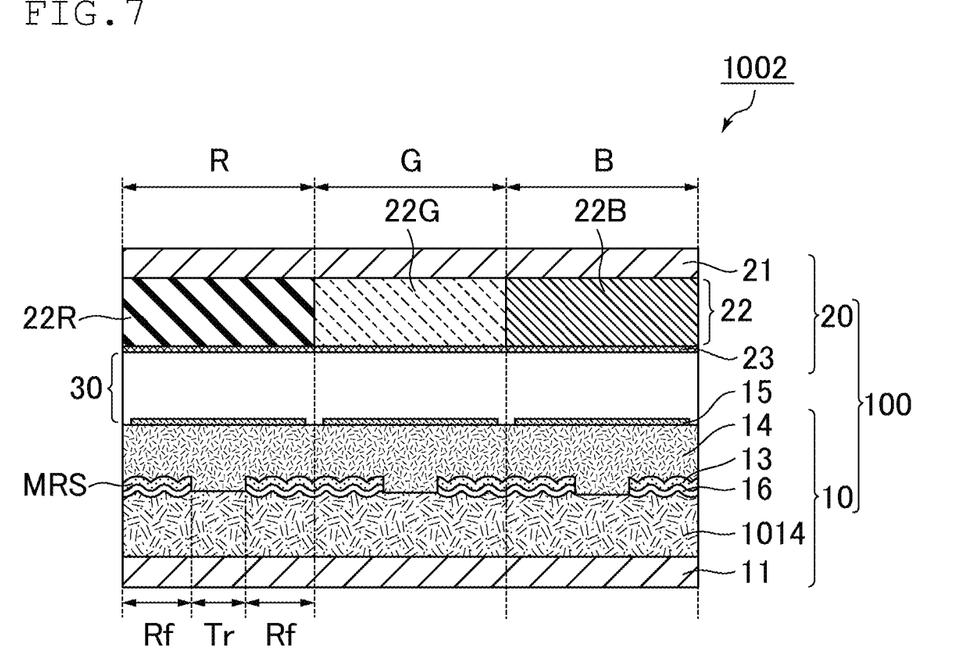
FIG. 7 is a schematic cross-sectional view of a liquid crystal display device of Comparative Example 2.

FIG. 7 is a schematic cross-sectional view of a liquid crystal display device of Comparative Example 2. As shown in FIG. 7, a liquid crystal panel 1002 of Comparative Example 2 had a structure similar to that in Example 1, except that the first substrate 10 included the transparent insulating layer 1014 in place of the first color filter layer behind the back surface side of the reflective electrode 13 (the side opposite to the liquid crystal layer 30). The transparent insulating layer 1014 was one similar to the transparent insulating layer 14 in Example 1.

Comparative Example 3

Figure 8:
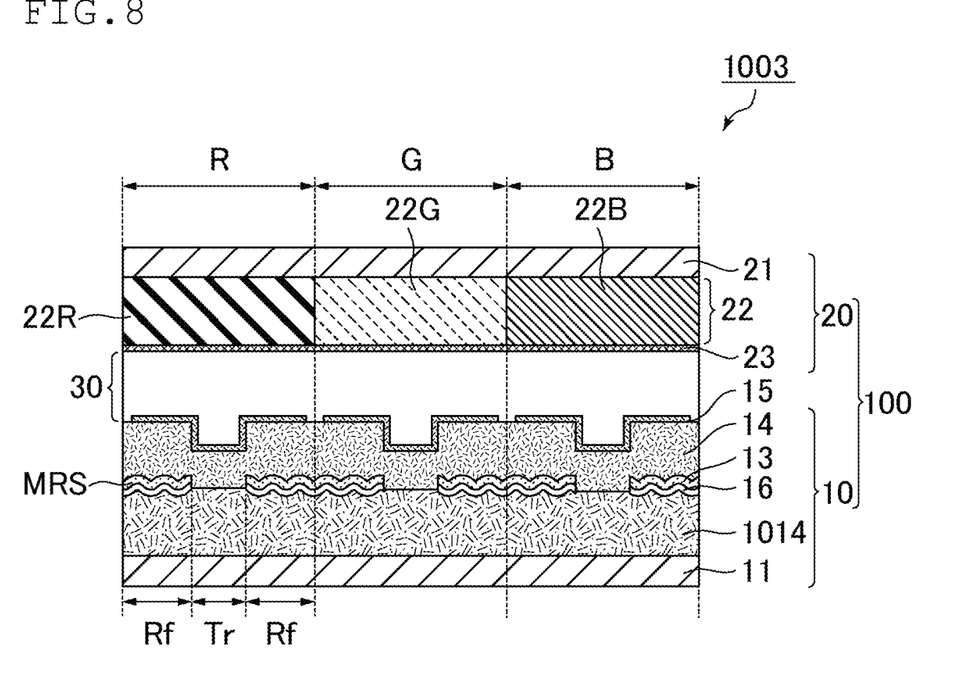
FIG. 8 is a schematic cross-sectional view of a liquid crystal display device of Comparative Example 3.

FIG. 8 is a schematic cross-sectional view of a liquid crystal display device of Comparative Example 3. As shown in FIG. 8, a liquid crystal panel 1003 of Comparative Example 3 had a structure similar to that in Example 2, except that the first substrate 10 included the transparent insulating layer 1014 in place of the first color filter layer behind the back surface side of the reflective electrode 13 (the side opposite to the liquid crystal layer 30). The transparent insulating layer 1014 was one similar to the transparent insulating layer 14 in Example 1.

(Measurement of Reflectance and Transmittance)

The normalized reflectance and normalized transmittance in Examples 1 and 2 and Comparative Examples 1 to 3 were determined through the following steps (1) to (4). The results are summarized in the following Table 1.

(1) The liquid crystal display devices of Comparative Examples 1 to 3 were produced to measure their reflectance spectrum and spectral radiance spectrum. The reflectance spectrum was measured with CM-700d available from Konica Minolta, Inc. The spectral radiance spectrum was measured with SR-UL1 available from Topcon Technohouse Corporation.

(2) From the measured reflectance spectrum and measured spectral radiance spectrum in each of Comparative Examples 1 to 3, the reflectance components of the reflective electrode; the transmittance components of the second color filter layer; the aperture ratio components of the liquid crystal panel based on the light-blocking components such as the gate lines and source lines; and the luminance components of the backlight were calculated. Thereby, the mode efficiency spectrum during reflective display and the mode efficiency spectrum during transmissive display (including transmittance components of the polarizing plate) in Comparative Examples 1 to 3 were determined.

(3) Using the mode efficiency spectrum during reflective display and the mode efficiency spectrum during transmissive display in Comparative Examples 1 to 3 determined in the step (2) above, the measured transmittance spectrum of the second color filter layer, the reflectance spectrum of the reflective electrode, the aperture ratio of the liquid crystal panel, the color-matching function with a 2 degree field of view, the illuminant D65 spectrum, and the spectral radiance spectrum of the backlight, the luminous reflectance and the luminance (Y stimulus value among XYZ stimulus values) in Example 1 and Example 2 in which two color filter layers were used were calculated.

(4) Thereafter, with the luminous reflectance and the luminance in Comparative Example 1 each taken as 1, the luminous reflectance and the luminance in each of Example 1, Example 2, Comparative Example 2, and Comparative Example 3 were respectively normalized to determine the normalized reflectance and the normalized transmittance.

(Measurement of NTSC Ratio)

The color gamut (NTSC ratio) during transmissive display in each of Comparative Examples 1 to 3 was determined by measuring the RBG luminance values (Y stimulus value among XYZ stimulus values) of the liquid crystal panel of interest placed on the backlight using a luminance meter (e.g., spectroradiometer SR-UL1 available from Topcon Technohouse Corporation). The NTSC ratio during transmissive display in each of Examples 1 and 2 was calculated based on the values obtained in the steps (1) to (3) above. The results are summarized in the following Table 1.

TABLE 1

| | Second color filter layer in second substreate | First color filter layer in first substrate | Display mode | Normalized reflectance | Normalized transmittance | NTSC ratio (%) |
|---|---|---|---|---|---|---|
| Comparative Example 1 | Present (2.0 μm) | Absent | VA-TN mode | 1 | 1 | 6.4 |
| Comparative Example 2 | Present (2.0 μm) | Absent | VA-TN mode | 1 | 1.18 | 8.5 |

TABLE 1-continued

|  | Second color filter layer in second substrate | First color filter layer in first substrate | Display mode | Normalized reflectance | Normalized transmittance | NTSC ratio (%) |
|---|---|---|---|---|---|---|
| Comparative Example 3 | Present (2.0 μm) | Absent | VA-ECB mode | 0.97 | 1.69 | 7.8 |
| Example 1 | Present (2.0 μm) | Present (2.0 μm) | VA-TN mode | 1 | 0.92 | 24.6 |
| Example 2 | Present (2.0 μm) | Present (2.0 μm) | VA-ECB mode | 0.97 | 1.33 | 22.9 |

As shown in Table 1, Examples 1 and 2 exhibited a lower transmittance in the transmissive regions than Comparative Examples 1 to 3 since the first substrate included the first color filter layer, but the NTSC ratio was about three times that in each of Comparative Examples 1 to 3, meaning that the color gamut was significantly improved.

Example 2, which employed the VA-ECB mode, exhibited a higher NTSC ratio and an equivalent or higher normalized transmittance than Comparative Examples 1 and 2 which employed the VA-TN mode. Since the structure of the liquid crystal panel in the reflective regions Rf in the part from the reflective electrode 13 and the components closer to the observer were the same between Example 1 and Comparative Example 2 and between Example 2 and Comparative Example 3, the normalized reflectance values were the same. Comparison between Example 1 and Comparative Example 2 and comparison between Example 2 and Comparative Example 3 show that the color gamut during transmissive display was successfully widened by increasing the thickness of the color filter layer contributing to transmissive display (the sum of the thickness of the first color filter layer 12 and the thickness of the second color filter layer 22 in the transmissive regions Tr) as compared to the thickness of the color filter layer contributing to reflective display (thickness of the second color filter layer 22).

Also, since Examples 1 and 2 employed a structure in which the liquid crystal molecules in the reflective region and the transmissive region in a single pixel were driven by the same pixel electrode and no insulating component such as a color filter layer was disposed on the pixel electrodes (on the liquid crystal layer side), a decrease in voltage applied to the liquid crystal layer due to the presence of the insulating component which possibly divides the applied voltage was prevented. Thus, bright display can be provided with low voltage applied during both reflective display and transmissive display.

REFERENCE SIGNS LIST

1, 1001, 1002, 1003: liquid crystal display device
10: first substrate
11: first supporting substrate
12: first color filter layer
12B, 22B: blue color filter
12G, 22G: green color filter
12R, 22R: red color filter
13: reflective electrode
13a: aperture in reflective electrode
14, 1014: transparent insulating layer
14a: dent in transparent insulating layer
15: pixel electrode
16: transparent electrode
17: first contact electrode
18: second contact electrode
19: third contact electrode
20: second substrate
21: second supporting substrate
22: second color filter layer
23: counter electrode
30: liquid crystal layer
40: first polarizing plate
41, 51: linearly polarizing plate
42, 52: phase difference layer
50: second polarizing plate
100: liquid crystal panel
200: backlight
201: light source
202: light guide plate
203: reflector
B: blue pixel
G: green pixel
P: pixel
R: red pixel
Rf: reflective region
Tr: transmissive region

What is claimed is:

1. A liquid crystal display device including a plurality of pixels arranged in a matrix pattern, the liquid crystal display device comprising:
   a liquid crystal panel including a first substrate, a second substrate opposite the first substrate, and a liquid crystal layer disposed between the first substrate and the second substrate,
   each of the plurality of pixels including a reflective region in which display is provided in a reflective mode and a transmissive region in which display is provided in a transmissive mode,
   the first substrate including, in an order toward the liquid crystal layer, a backplane circuit for driving the plurality of pixels, a first color filter layer, a reflective electrode, a transparent insulating layer disposed in the reflective region and the transmissive region, and pixel electrodes,
   the reflective electrode being disposed in the reflective region and provided with an aperture in the transmissive region,
   the pixel electrodes being disposed in respective pixels of the plurality of pixels, each of the pixel electrodes being disposed in the reflective region and the transmissive region in a corresponding pixel of the plurality of pixels,
   at least one of the pixel electrodes being electrically connected to the backplane circuit through a first contact hole penetrating the first color filter layer and a second contact hole penetrating the transparent insulating layer,
   the first contact hole and the second contact hole being formed inside an outer edge of the transmissive region in a plan view, and
   the second substrate including a second color filter layer and a counter electrode.

2. The liquid crystal display device according to claim 1, wherein the reflective electrode is disposed over the plurality of pixels.

3. The liquid crystal display device according to claim 1, wherein liquid crystal molecules in the liquid crystal layer are twist-aligned.

4. The liquid crystal display device according to claim 1, wherein the transparent insulating layer is provided in the transmissive region with a dent that is dented in a direction from the liquid crystal layer toward the first color filter layer, and a corresponding pixel electrode covers a surface of the dent, and a liquid crystal layer side surface of each pixel electrode disposed in the transmissive region is located closer to the first color filter layer than a liquid crystal layer side surface of each pixel electrode disposed in the reflective region is.

5. The liquid crystal display device according to claim 4, wherein an alignment azimuth of liquid crystal molecules located near the first substrate is parallel to an alignment azimuth of liquid crystal molecules located near the second substrate.

6. The liquid crystal display device according to claim 1, wherein the liquid crystal layer contains liquid crystal molecules having a negative anisotropy of dielectric constant, and one vertical alignment film is disposed between the counter electrode and the liquid crystal layer and another vertical alignment film is disposed between each pixel electrode and the liquid crystal layer.

7. The liquid crystal display device according to claim 1, wherein the liquid crystal layer contains liquid crystal molecules having a positive anisotropy of dielectric constant, and one horizontal alignment film is disposed between the counter electrode and the liquid crystal layer and another horizontal alignment film is disposed between each pixel electrode and the liquid crystal layer.

8. The liquid crystal display device according to claim 1, wherein the reflective electrode has an irregular structure in a liquid crystal layer side surface.

9. The liquid crystal display device according to claim 1, further comprising:

a first polarizing plate on or near a first substrate side surface of the liquid crystal panel, and a second polarizing plate on or near a second substrate side surface of the liquid crystal panel.

10. The liquid crystal display device according to claim 9, wherein at least one of the first polarizing plate or the second polarizing plate is a circularly polarizing plate.

11. A liquid crystal display device including a plurality of pixels arranged in a matrix pattern, the liquid crystal display device comprising:

a liquid crystal panel including a first substrate, a second substrate opposite the first substrate, and a liquid crystal layer disposed between the first substrate and the second substrate, each of the plurality of pixels including a reflective region in which display is provided in a reflective mode and a transmissive region in which display is provided in a transmissive mode, the first substrate including, in an order toward the liquid crystal layer, a first color filter layer, a transparent electrode, a reflective electrode, a transparent insulating layer disposed in the reflective region and the transmissive region, and pixel electrodes, the reflective electrode being disposed in the reflective region and provided with a first aperture in the transmissive region, the pixel electrodes being disposed in respective pixels of the plurality of pixels, each of the pixel electrodes being disposed in the reflective region and the transmissive region in a corresponding pixel of the plurality of pixels, the transparent electrode being stacked on a back surface side of the reflective electrode and being in contact with the first color filter layer, and the second substrate including a second color filter layer and a counter electrode.

12. The liquid crystal display device according to claim 11, wherein the transparent electrode is provided with a second aperture that is aligned with the first aperture and that exposes a portion of the first color filter layer.

* * * * *